W. H. McKENZIE.
SCREW TAP SUPPORT.
APPLICATION FILED JUNE 4, 1918.

1,293,143.

Patented Feb. 4, 1919.
2 SHEETS—SHEET 1.

Inventor
W. H. McKenzie.

By Lacey & Lacey, Attorneys

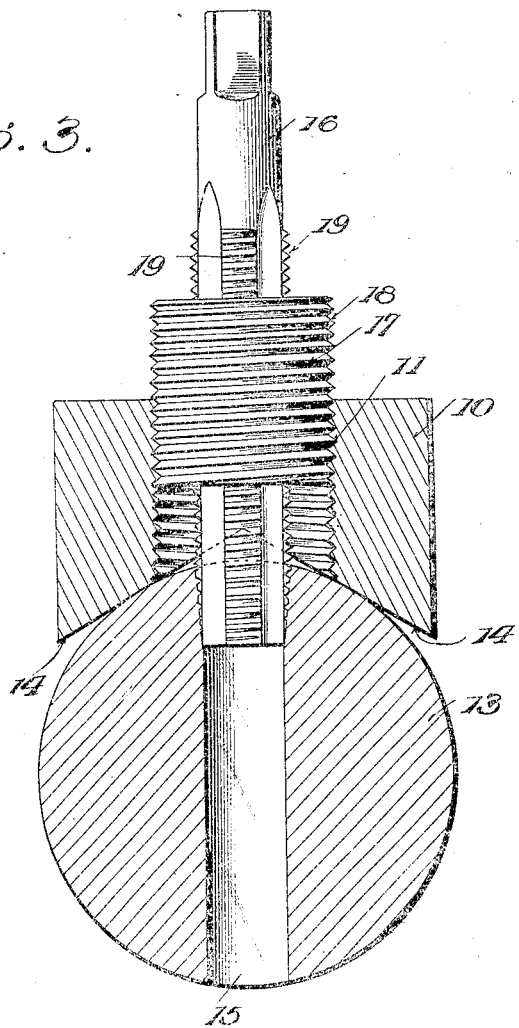

UNITED STATES PATENT OFFICE.

WILLIAM H. McKENZIE, OF OAKLAND, CALIFORNIA.

SCREW-TAP SUPPORT.

1,293,143.

Specification of Letters Patent.

Patented Feb. 4, 1919.

Application filed June 4, 1918. Serial No. 238,161.

*To all whom it may concern:*

Be it known that I, WILLIAM H. MCKENZIE, a citizen of the United States, residing at Oakland, in the county of Alameda and State of California, have invented certain new and useful Improvements in Screw-Tap Supports, of which the following is a specification.

This invention relates to implements for guiding a screw tap when cutting a screw thread in an opening, and has for one of its objects to provide a simply constructed device which may be readily applied without structural change either in the tap or in the body in which the thread is to be cut, and which may be readily adapted to bodies of various forms and sizes.

With these and other objects in view, the invention consists in certain novel features of construction, as hereinafter shown and described and then specifically pointed out in the claim; and in the drawings illustrative of the preferred embodiment of the invention—

Fig. 3 is a view similar to Fig. 1, illustrating the manner of applying the improved device to a body having a curved surface.

Figure 1:
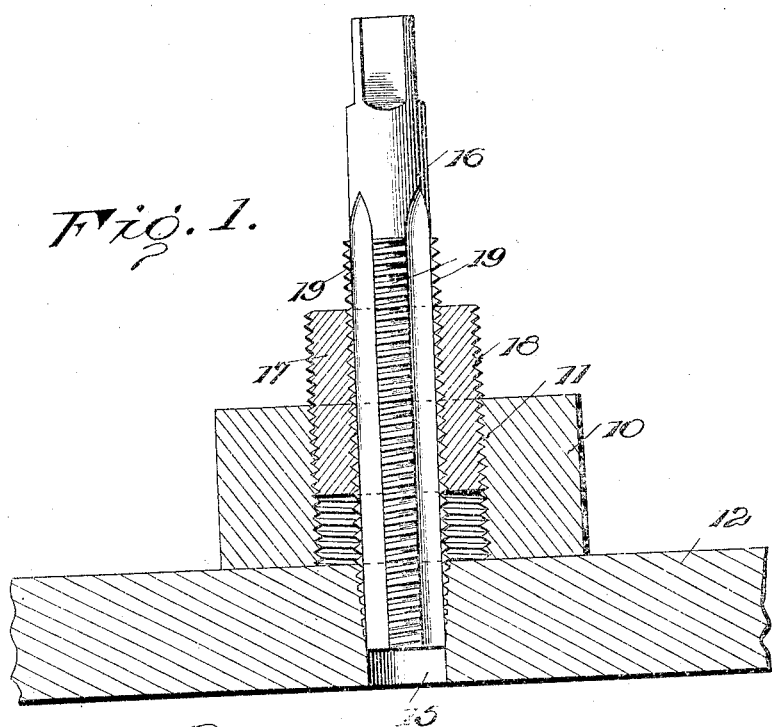
Figure 1 is a sectional elevation of the improved implement.
Figure 2:
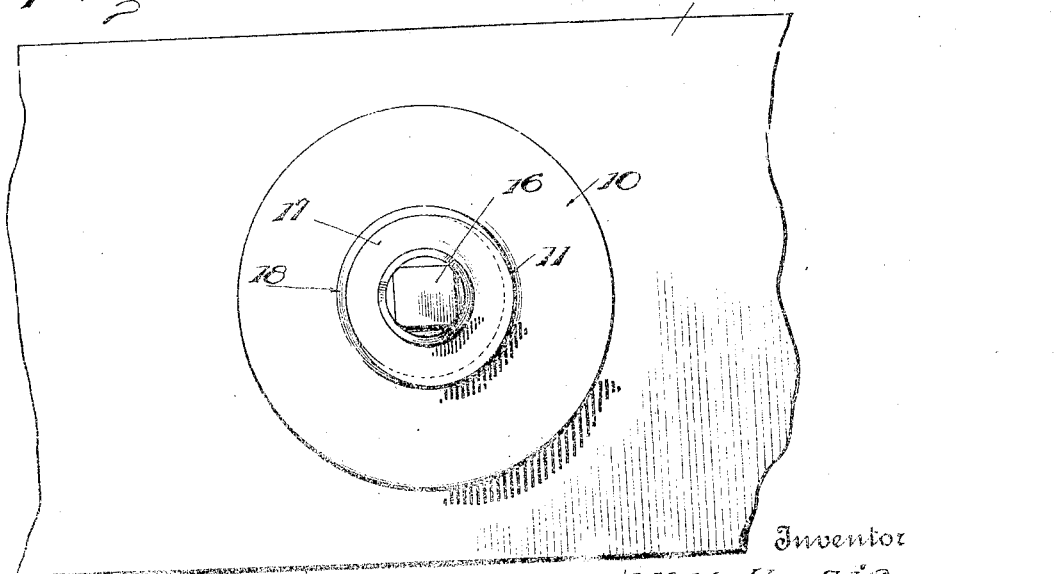
Fig. 2 is a plan view of the parts shown in Fig. 1.

The improved device comprises a supporting member represented as a whole at 10 and provided with a threaded aperture 11 therethrough. The lower face of the body 10 conforms to and is adapted to bear upon the work in which the thread is to be cut. For instance in Figs. 1 and 2 the member in which the thread is to be cut, indicated at 12, is provided with a flat face, and the member 10 will be provided with a correspondingly flat lower face. In Fig. 3 the member in which the thread is to be cut, indicated at 13, is circular or with a curved surface, and the body 10 is formed with a reversely inclined lower face 14 to engage the curved face of the member 13 as shown.

The aperture to be threaded is indicated at 15, and the thread cutting tap at 16. Fitting within the aperture 11 is a guide sleeve 17 externally threaded as shown at 18 to adjustably engage the threads of the aperture 11, and internally threaded to receive the mutilated threads 19 of the tap. By this means the tap is effectually guided within the aperture 15 of the member 12 and accuracy of the operation of the tap assured.

By the use of the improved device it is practically impossible to tap a hole in the member 10 other than perfectly straight, or at right angles to the outer surface of the work. By means of the improved device any person without previous skill or knowledge can thread an aperture in a plate or other work with accuracy and precision. The body 10 is maintained at all times in parallel relation to the surface of the member to be tapped, and no pressure upon the tapping tool other than that provided by the guiding device itself, is necessary to produce maximum results.

The use of the improved device obviates danger of breaking or injuring the tapping tool. By using the improved device no necessity exists for "squaring up" the work with a hand square, which must be done under ordinary circumstances, and the necessity for employing supporting brackets, "jigs", drill presses and like devices is obviated.

The improved implement is simple in construction, can be inexpensively manufactured, and furnished to the trade as a new article of manufacture.

Having thus described the invention, what is claimed as new is:

As a new article of manufacture, a supporting member having its lower face conforming to and adapted to bear against the work to be tapped and having a threaded opening therein, and an externally threaded guide sleeve engaging the threads of the opening in the supporting member and internally threaded to receive the threads of a screw tap, said sleeve being adjustable vertically with respect to the supporting member.

In testimony whereof I affix my signature.

WILLIAM H. McKENZIE. [L. S.]